US012618450B2

(12) United States Patent
Venkateswaran et al.

(10) Patent No.: US 12,618,450 B2
(45) Date of Patent: May 5, 2026

(54) DIRT INGRESS SEAL

(71) Applicant: CARL FREUDENBERG KG,
Weinheim (DE)

(72) Inventors: Perambur Krishnan Venkateswaran,
Sriperumbudar (IN); Sowmik Sur,
Kattupakkam (IN)

(73) Assignee: Carl Freudenberg KG, Weinheim
(DE)

( * ) Notice: Subject to any disclaimer, the term of this
patent is extended or adjusted under 35
U.S.C. 154(b) by 11 days.

(21) Appl. No.: 18/249,385

(22) PCT Filed: Oct. 26, 2021

(86) PCT No.: PCT/IB2021/059871
§ 371 (c)(1),
(2) Date: Apr. 18, 2023

(87) PCT Pub. No.: WO2022/090918
PCT Pub. Date: May 5, 2022

(65) Prior Publication Data
US 2023/0383812 A1 Nov. 30, 2023

(30) Foreign Application Priority Data

Oct. 26, 2020 (IN) .............................. 202021046706

(51) Int. Cl.
*F16J 15/36* (2006.01)
*F16F 9/36* (2006.01)
(Continued)

(52) U.S. Cl.
CPC ............. *F16F 9/36* (2013.01); *F16J 15/3212*
(2013.01); *F16J 15/3244* (2013.01); *F16J*
*15/3252* (2013.01)

(58) Field of Classification Search
CPC .. F16J 15/3212; F16J 15/3244; F16J 15/3252;
F16J 15/36; F16J 15/3232; F16J 15/3268
See application file for complete search history.

(56) References Cited

U.S. PATENT DOCUMENTS 3,927,600 A * 12/1975 Peisker .................. F16J 15/328
409/84
3,929,340 A * 12/1975 Peisker ................ F16J 15/3244
277/560
(Continued)

FOREIGN PATENT DOCUMENTS

WO WO-2014183542 A1 * 11/2014 ............... F16J 15/56

*Primary Examiner* — Christine M Mills
*Assistant Examiner* — L. Susmitha Koneru
(74) *Attorney, Agent, or Firm* — Sand, Sebolt & Wernow
Co., LPA

(57) ABSTRACT

The present disclosure is related to a dirt ingress seal (100)
for shock absorbers and front forks. The dirt ingress seal
comprising a first lip (102*a*) that isolates the internal space
of the seal (100) from the atmosphere and external environ-
ment; first ribs (105*a*) formed on the inner side of the
circumferential surface of the dirt ingress seal (100), the first
ribs (105*a*) formed near the first lip (102*a*); a second lip
(102*b*) provided on the inner circumferential portion near
the central region of the dirt ingress seal (100); second ribs
(105*b*) defining cavities; and cavities defined by the first ribs
(105*a*). The cavities are configured to arrest and trap mud,
dust, dirt, and particulate matter entering the sealed zone and
preventing further ingress of abrasive particles into the seal
zone. The seal (100) increases the sealing effectiveness and
useful life of seals, shock absorber, and front forks.

12 Claims, 4 Drawing Sheets

(51) Int. Cl.

|  |  |
|---|---|
| *F16J 15/3212* | (2016.01) |
| *F16J 15/3244* | (2016.01) |
| *F16J 15/3252* | (2016.01) |

(56)                     References Cited

U.S. PATENT DOCUMENTS

| | | | | |
|---|---|---|---|---|
| 3,973,781 | A  * | 8/1976 | Grorich ................... | F16C 33/22 |
| | | | | 277/400 |
| 4,084,826 | A  * | 4/1978 | Vossieck .............. | F16J 15/3244 |
| | | | | 277/559 |
| 4,799,808 | A  * | 1/1989 | Otto ................... | F16C 33/7823 |
| | | | | 277/575 |
| 5,649,709 | A | 7/1997 | Munekata et al. | |
| 6,431,552 | B1 * | 8/2002 | Ulrich ................... | F16J 15/322 |
| | | | | 277/560 |
| 2002/0163138 | A1 * | 11/2002 | Dietle ................. | F16J 15/3244 |
| | | | | 277/559 |
| 2007/0241515 | A1 * | 10/2007 | Sato ................... | F16C 33/7823 |
| | | | | 277/549 |
| 2008/0292231 | A1 * | 11/2008 | Matsui ................ | F16J 15/3276 |
| | | | | 384/486 |
| 2014/0175753 | A1 * | 6/2014 | Antoine ................ | F16J 15/344 |
| | | | | 277/358 |
| 2021/0215250 | A1 * | 7/2021 | Yamada ................... | F16J 15/18 |

* cited by examiner

FIG. 2A                    FIG. 2B

DIRT INGRESS SEAL

FIELD

The present disclosure relates to the field of dirt seals used in shock absorbers and forks.

BACKGROUND

The background information herein below relates to the present disclosure but is not necessarily prior art.

Presently, the seals available in the market have a basic design, which provides a primary protection from dust. This basic design has been in use for many years. The design of conventional dirt seals does the basic sealing of shock absorbers and front forks from dust and mud entry.

However, the drawback of the conventional seals in the market is that they are configured to provide basic dust sealing function in environments with low to medium level of dust. The conventional seals fail to control the further travel of dust, once the dust enters the sealing area. Once the dust enters the system, they create damage to the lip surface and the lid edges which in turn results in leakage of oil from the shock absorbers and front forks. Further, several countries such as India have severe environmental conditions like dusty roads, muddy roads which impact the function of the sealing system of the shock absorbers and front forks, specifically in the motorcycle and scooter segments. This issue is mostly faced in off-road vehicles such as the one used in recreation segment. Dust entry impacts the function of the seal. Most shock absorbers and front forks manufacturers and motorcycle manufacturers come across this issue and seek for improvement in the designs of seals.

Therefore, there is felt a need to provide a dirt ingress seal that alleviates the above mentioned drawbacks.

OBJECTS

Some of the objects of the present disclosure, which at least one embodiment herein satisfies, are as follows:

An object of the present disclosure is to provide an efficient dirt ingress seal for shock absorbers and forks.

Another object of the present disclosure is to provide a dirt ingress seal for shock absorbers and forks that works in an environment with a significantly high dust and/or mud content.

Yet another object of the present disclosure is to provide a dirt ingress seal that controls and prevents the further travel of dust into the sealing area of the shock absorbers and front forks.

Still another object of the present disclosure is to provide a dirt ingress seal that increases the useful life of shock absorbers and front forks.

Other objects and advantages of the present disclosure will be more apparent from the following description, which is not intended to limit the scope of the present.

SUMMARY

The present disclosure envisages a dirt ingress seal. The dirt ingress seal is used in shock absorbers and forks. The dirt ingress seal comprises a first lip configured to isolate the internal space of the dirt ingress seal from atmosphere and external environment, a first set of ribs formed on the inner side of the circumferential surface of the dirt ingress seal wherein the first set of ribs are formed below the first lip, a second lip configured on the inner circumferential portion near the central region of the dirt ingress seal, a second set of ribs formed on the inner side of the circumferential surface of the dirt ingress seal wherein the second set of ribs formed below the second lip, a first set of cavities defined by the first set of ribs, and a second set of cavities defined by the second set of ribs. The cavities are configured to arrest and trap mud, dust, dirt, and particulate matter entering the dirt ingress seal to prevent further ingress of abrasive particles into the seal zone. The dirt ingress seal further comprises a moat structure formed between the first set of ribs and the second lip. The moat structure defines a U-shaped pocket between the second lip and the first set of ribs configured for retaining particulate matter therewithin.

In an embodiment, the shape of the cavities is selected from the group consisting of square, rectangle, diamond, and polygon.

In another embodiment, a circumferential groove is provided on the outer surface of the dirt ingress seal.

In another embodiment, a spring is placed in the circumferential groove to improve sealing performance of the dirt ingress seal.

In another embodiment, the spring is selected from the group consisting of an oil seal spring, a ring spring, a mechanical connecting spring and a circular resilient element. The spring is configured to apply radially inward force on the groove and thereby the first lip.

In another embodiment, the material of the spring is selected from the group consisting of steel, stainless steel, and composite material.

In another embodiment, the spring is configured to absorb shocks.

In another embodiment, the material of the dirt ingress seal is selected from the group consisting of rubber, vulcanized rubber, synthetic rubber, and polymers.

In another embodiment, a reinforcement element is embedded inside the dirt ingress seal to impart strength.

In another embodiment, the material of the reinforcement element is selected from the group consisting of steel, stainless steel, and composite material.

In yet another embodiment, the second set of ribs defines at least one zig-zag shaped channel therebetween.

BRIEF DESCRIPTION OF THE ACCOMPANYING DRAWING

The dirt ingress seal of the present disclosure will now be described with the help of the accompanying drawing, in which.

LIST OF REFERENCE NUMERALS

100—Dirt ingress seal
102*a*-First lip
102*b*-Second lip
105*a*-First set of grooves
105*b*—Second set of grooves
106*a*—First set of cavities
106*b*—Second set of cavities 108—Moat structure
110—Reinforcement element
120—Spring
122—Circumferential groove

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including" and "having" are open-ended transitional phrases and therefore specify the presence of stated features, elements, modules, units and/or components, but do not forbid the presence or addition of one or more other features, elements, components, and/or groups thereof.

When an element is referred to as being "mounted on", "engaged to", "connected to" or "coupled to" another element, it may be directly on, engaged, connected or coupled to the other element. As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Terms such as "bottom", "inner", "outer", "beneath", "below", "lower", "above", "upper" and the like, may be used in the present disclosure to describe relationships between different elements as depicted from the figures.

The present description envisages a dirt ingress seal for shock absorbers and forks. The forks can be front forks, rear forks or any forks adapted to use along with suspension system.

Figure 1:
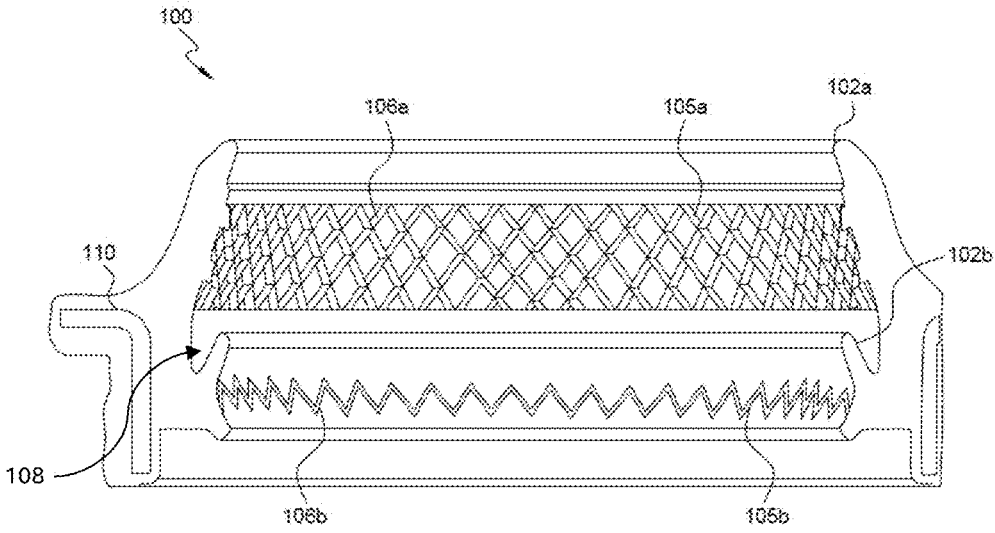
FIG. 1 shows a cut section view of the dirt seal in accordance with an embodiment of the present disclosure.

FIG. 1 shows a cut section view of a dirt ingress seal 100 (hereinafter also referred to as 'dirt seal 100') in accordance with an embodiment of the present disclosure.

FIG. 2A shows a front view of the dirt seal of FIG. 1. The seal 100 as shown in FIGS. 1 and 2A comprises at least two cross ribs 105a formed on the operative top portion of the seal 100.

The sealing solution of the present disclosure is directed to stop dirt or mud ingress into the inner region of a sealed zone when operating in harsh environmental conditions.

Figure 2:
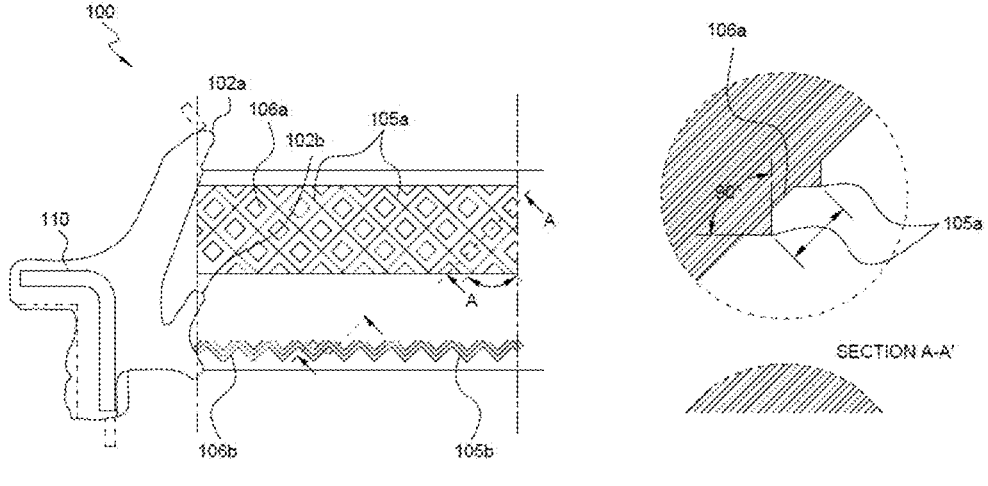
FIG. 2A shows a front view of the dirt seal of FIG. 1.
FIG. 2B shows a cross section view of the dirt seal of FIG. 2A along the plane A-A.

FIG. 2b shows a cross section view of the dirt seal of FIG. 2 along the plane A-A.

The dirt ingress seal 100 comprises a first lip 102a and a second lip 102b formed on the internal surface thereof. The first lip 102a isolates the internal space of the dirt ingress seal 100 from the atmosphere and external environment. The first lip 102a acts as a first line of defense to restrict impurities from entering into a sealed region of a shock absorber system, while the second lip 102b acts as a second line of defense to restrict impurities from entering into the sealed region.

The dirt ingress seal 100 further comprises a first set of ribs 105a formed on the inner side of the circumferential surface of the dirt seal 100. The first set of ribs 105a is formed below the first lip 102a which is the operative outer lip. Similarly, a second set of ribs 105b is formed on the inner side of the circumferential surface of the dirt seal 100 and below the second lip 102b. The ribs are configured in a cross rib manner.

These first set of ribs 105a defines a first set of cavities 106a therein. The second set of ribs 105b defines a second set of cavities 106b therein. These cavities act as arrestors or barriers and are configured to capture any foreign particles entering the sealed region of the shock absorber system or the forks. This prevents the dust and dirt particles from further reaching out to the sealed region/lip of the shock absorbers and front forks. The teachings of the present disclosure can be used in forks used automobile, kids toys, kid bikes/cycles, and different machines as well.

The action of the first set of ribs 105a and the second set of ribs 105b as arrestors or barriers in turn reduces and prevents the damage to the lip edge and lip surfaces of the shock absorbers and forks. The dirt ingress seal 100 of the present disclosure helps in increasing the useful life of the dirt seal 100, the shock absorbers and front forks.

The dirt ingress seal (100) further comprises a moat structure (108) formed between the first set of ribs (105a) and the second lip (102b). The moat structure defines a U-shaped pocket between the second lip and the first set of ribs for retaining particulate matter therewithin.

In an embodiment, the second set ribs 105b are of zig-zag in shape and the zig-zag pattern runs along the circumference of the dirt seal 100. The first and second set of ribs 105a, 105b can be configured in different orientations to form as square, rectangular, or polygonal patterns.

The cavities defined by the first and second set of ribs 105a, 105b can be in the shape of diamond, square, rectangle, zig-zag channel or any suitable polygon.

The material of the seal is synthetic rubber or any chemically treated elastic polymer. For example, the material can be selected from the group consisting of natural rubber, vulcanized rubber, synthetic rubber, and other suitable polymers.

In an embodiment, a reinforcement element 110 is embedded in the body of the dirt seal 100. The reinforcement element 110 is made of metal or composite material having resilient properties. The reinforcement element 110 embedded inside the dirt ingress seal 100 imparts strength and increases reliability under extreme operating conditions. The operating conditions may involve heavy vibrations, high temperature, dusty and muddy environment. In an embodiment, the material of the reinforcement element 110 is selected from the group consisting of steel, stainless steel, and composite material.

Figure 3:
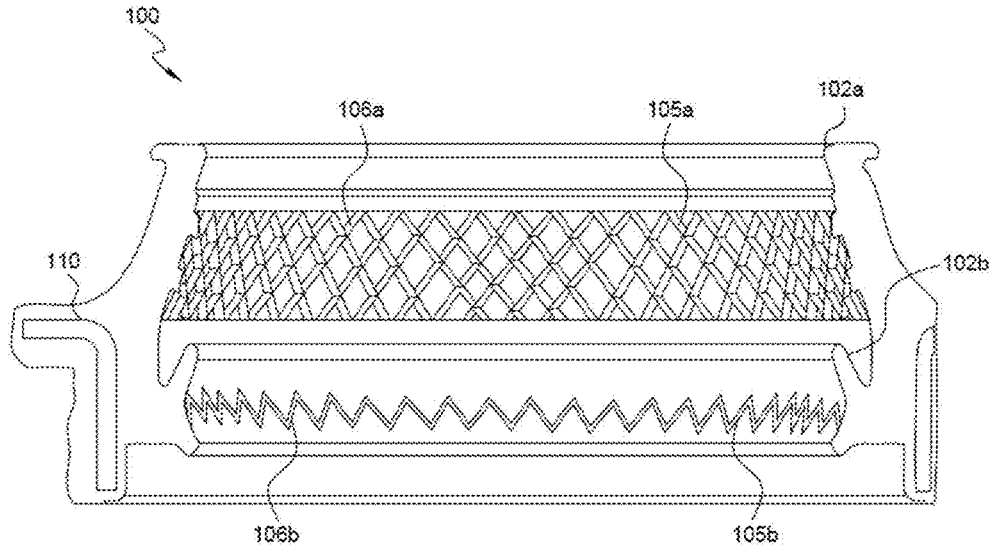
FIG. 3 shows a cut section view of the dirt seal in accordance with another embodiment of the present disclosure.

Similarly, FIG. 3 shows a cut section view of the dirt seal in accordance with another embodiment of the present disclosure.

Figure 4:
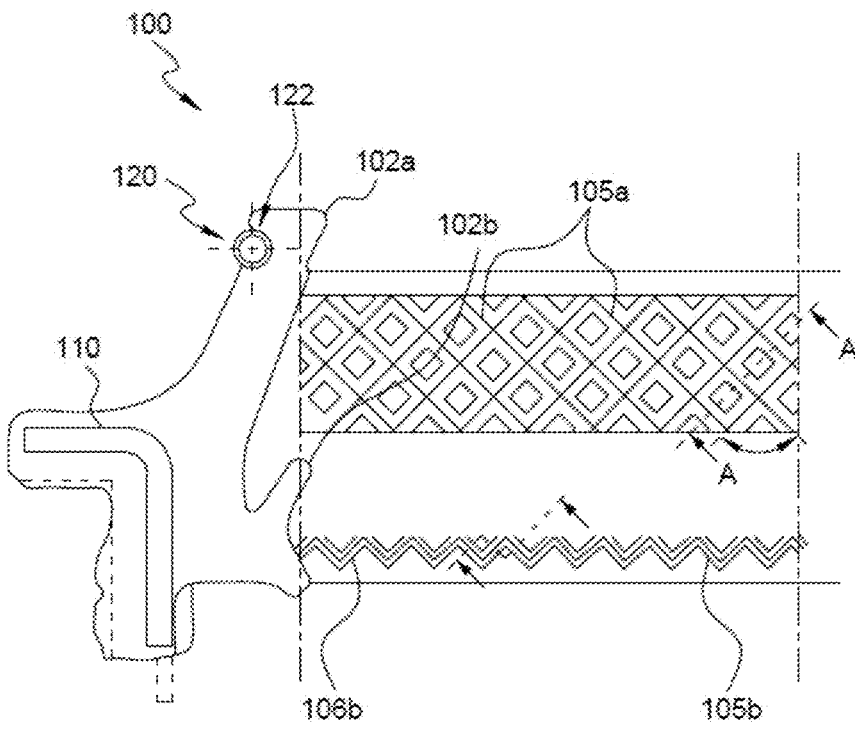
FIG. 4 shows a front view of the dirt seal of FIG. 3.

FIG. 4 shows a front view of the dirt seal of FIG. 3. According to an embodiment, the dirt seal 100 of FIGS. 3 and 4 comprises rows of diamond shaped ribs patterns.

The major novel and non-obvious feature of the invention are the diamond shaped ribs and cavities in between them.

These diamond shaped ribs are provided in both the working direction of the shock absorber and forks. These ribs are provided in such direction, enabling them to collect the dirt in cavities formed therein. The dirt seal 100 functions on the principle of arrest/contain/barrier, since the dirt is being arrested from entering the main seal functional area.

In an embodiment a circumferential groove 122 is provided on the outer surface of the dirt ingress seal 100 near the first lip 102*a*. A spring 120 is provided in the groove 122 to increase the sealing force and to absorb shocks, if any. The spring 120 can be an oil seal spring, a ring spring, a mechanical connecting spring, or any circular resilient element configured to apply radially inward force on the groove 122 of the dirt ingress seal 100, and thereby the first lip 102*a*. The material of the spring 120 is selected from the group consisting of steel, stainless steel, and composite material.

The main purpose of the present invention is to enhance the sealing function for the dirt exclusion, and arresting the dirt and preventing the entry of the dust into the main sealing area and inside the shock absorbers and front forks system. This ultimately enhances the functionality and efficiency of the shock absorbers and front forks.

The ribs 105*a*, 105*b* and the cavities 106*a*, 106*b* collect and hold the foreign particles that enter the dust seal and do not allow them to go further into the main sealing region. The ribs 105*a*, 105*b* are provided in such a way that the dirt and dust particles settle down in the cavities defined therebetween.

This is specifically applicable to the front forks & rear shock absorbers and front forks for the recreation motorcycle and scooter segment, which operate in extremely harsh, dusty, and muddy environment.

The seal of the present disclosure has been validated via following tests:

Dust Test

Mud test

Friction Test

The primary object of the present disclosure is to develop a sealing solution to stop ingress of dirt/mud from the external environment. Such harsh environment is mostly encountered in rural and developing areas, primarily in Indian and secondly in Chinese region. The application of the invention of the present disclosure is found within the bikes, bicycles, off-road vehicles, dirt cars and other regions. The dirt seal can also be used in recreational vehicles.

The foregoing description of the embodiments has been provided for purposes of illustration and not intended to limit the scope of the present disclosure. Individual components of a particular embodiment are generally not limited to that particular embodiment but are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of a dirt ingress seal for shock absorbers and forks, which:

reduces the wear of seal lip due to dust;

operates effective in dusty and muddy environment; and controls the further travel of dust further inside the sealing area.

The foregoing disclosure has been described with reference to the accompanying embodiments, which do not limit the scope and ambit of the disclosure. The description provided is purely by way of example and illustration.

The embodiments herein, the various features, and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Any discussion of devices, articles or the like that has been included in this specification is solely for the purpose of providing a context for the disclosure. It is not to be taken as an admission that any or all of these matters form a part of the prior art base or were common general knowledge in the field relevant to the disclosure, as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A dirt ingress seal (100) for a shock absorber and forks, said dirt ingress seal (100) comprising:

a. a first lip (102*a*) configured to isolate an internal space of the dirt ingress seal (100) from atmosphere and external environment;

b. a first set of ribs (105*a*) formed on an inner side of a circumferential surface of said dirt ingress seal (100), said first set of ribs (105*a*) formed below said first lip (102*a*);

c. a second lip (102*b*) configured on an inner circumferential portion near a central region of said dirt ingress seal (100), wherein said dirt ingress seal (100) comprises a first end and a second end spaced apart from one another and the central region is between the first end and the second end;

d. a second set of ribs (105*b*) formed on the inner side of the circumferential surface of said dirt ingress seal (100), said second set of ribs (105*b*) formed below said second lip (102*b*);

e. a first set of cavities (106*a*) defined by said first set of ribs (105*a*);

f. a second set of cavities (106*b*) defined by said second set of ribs (105*a*), said cavities (106*a*, 106*b*) being configured to arrest and trap mud, dust, dirt, and particulate matter entering said dirt ingress seal (100) to prevent further ingress of abrasive particles into a seal zone; and g. a moat structure (108) formed between said first set of ribs (105*a*) and said second lip (102*b*), said moat structure defining a U-shaped pocket between said second lip and said first set of ribs for retaining particulate matter therewithin.

2. The dirt ingress seal (100) as claimed in claim 1, wherein a shape of said first set of cavities (106*a*) and said second set of cavities (106*b*) is one of square, rectangle, diamond, and polygon.

3. The dirt ingress seal (100) as claimed in claim 2, wherein a spring (120) is placed in said circumferential groove (122) to improve sealing performance of said dirt ingress seal (100).

4. The dirt ingress seal (100) as claimed in claim 3, wherein said spring (120) is one of an oil seal spring, a ring spring, a mechanical connecting spring and a circular resilient element, and wherein said spring (120) is configured to apply radially inward force on said circumferential groove (122) and thereby to said first lip (102*a*).

5. The dirt ingress seal (100) as claimed in claim 3, wherein a material of said spring (120) is one of steel, stainless steel, and a composite material.

6. The dirt ingress seal (100) as claimed in claim 3, wherein said spring (120) is configured to absorb shocks.

7. The dirt ingress seal (100) as claimed in claim 1, wherein a circumferential groove (122) is provided on an outer surface of said dirt ingress seal (100).

8. The dirt ingress seal (100) as claimed in claim 1, wherein a material of said dirt ingress seal (100) is one of rubber, vulcanized rubber, synthetic rubber, and polymers.

9. The dirt ingress seal (100) as claimed in claim 1, wherein a reinforcement element (110) is embedded inside said dirt ingress seal (100) to impart strength.

10. The dirt ingress seal (100) as claimed in claim 9, wherein a material of said reinforcement element (110) is one of steel, stainless steel, and composite material.

11. The dirt ingress seal (100) as claimed in claim 9, wherein at least a portion of the reinforcement element (110) extends downwardly beyond a bottom end of the second lip.

12. The dirt ingress seal (100) as claimed in claim 1, wherein said second set of ribs (105*b*) defines at least one zig-zag shaped channel there between.

* * * * *